June 28, 1938. R. R. R. SARAZIN Re. 20,773

MEANS ADAPTED TO REDUCE THE TORSIONAL OSCILLATIONS OF CRANKSHAFTS

Original Filed July 30, 1931 2 Sheets-Sheet 1

Inventor

Raoul R. R. Sarazin

By Bailey & Larson

Attorneys

June 28, 1938. R. R. R. SARAZIN Re. 20,773

MEANS ADAPTED TO REDUCE THE TORSIONAL OSCILLATIONS OF CRANKSHAFTS

Original Filed July 30, 1931 2 Sheets-Sheet 2

Inventor
Raoul R. R. Sarazin,

By Bailey & Parson
Attorneys

Reissued June 28, 1938

Re. 20,773

UNITED STATES PATENT OFFICE 20,773

MEANS ADAPTED TO REDUCE THE TORSIONAL OSCILLATIONS OF CRANK-SHAFTS

Raoul Roland Raymond Sarazin, Saint-Prix, France

Original No. 2,079,226, dated May 4, 1937, Serial No. 554,056, July 30, 1931. Renewed February 29, 1936. Application for reissue December 9, 1937, Serial No. 179,033. In France December 19, 1930

16 Claims. (Cl. 74—574)

As is well-known, the crank-shafts of motors such as Diesel engines, internal combustion motors and the like, having a variable torque in their revolution, display in any sequence of distribution along their length inertias and resiliencies giving rise, at certain velocities of revolution, to torsional resonance speeds due to the harmonics of the driving torques and to the inertia of the pistons and connecting-rods.

It is generally sought to eliminate such velocities, which are dangerous, beyond normal speeds of revolution, by increasing as far as possible the resilient rigidity of the shaft whilst reducing its inertia.

This invention aims at providing means adapted to reduce the torsional oscillations of said crank-shafts.

A feature of said means consists of the provision of mobile masses adapted to move at an angle relatively to the shaft of the motor, around which they constitute a kind of fly-wheel having inertia relatively to torsional impulses, said masses being so interconnected and connected to the shaft by any suitable means as to ensure permanent balancing of the whole device.

Fly-wheels of this type may be arranged at one or more points intermediate the ends of the shaft of the motor.

Said masses may likewise be radially movable, so that their centers of gravity may move towards or away from that of the shaft.

In the attached drawings, which show by way of examples various diagrammatical constructional embodiments of the device according to the invention:

Figure 1:
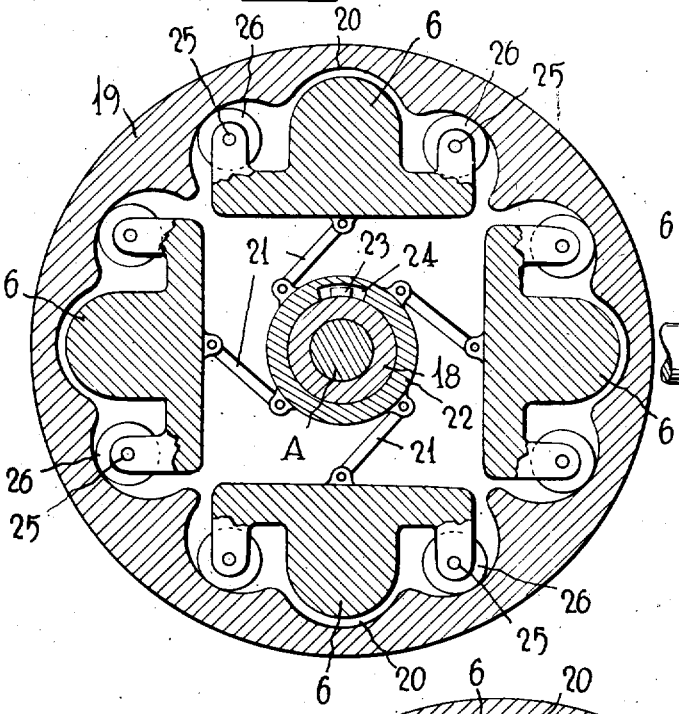
Figure 1 is a cross-sectional view of an engine shaft and of a construction of my invention.
Figure 2:
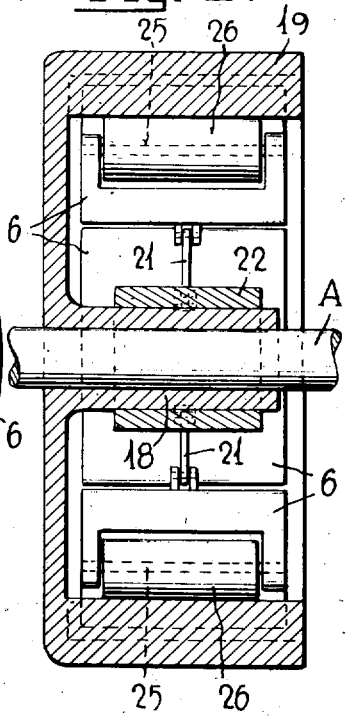
Figure 2 is a diametric sectional view in a plane of said shaft.

In Figs. 1 and 2 a member 19 having inner cavities 20 is keyed upon shaft A, under consideration, by means of a central muff 18. A certain number of masses 6 are adapted to move circularly, in one or other direction, in relation to said member 19 and within the same and are in connection, by means of hinged links 21, with a crown 22 freely revolving upon muff 18. In order that the travel of said masses 6 may be limited, muff 18 carries a spur 23 adapted to strike the two ends of a cavity 24 provided within crown 22.

Each end of the masses 6 carries an axle 25 which itself carries a roll 26, said rolls being constantly applied against the sides of hollows 20 by centrifugal force, when shaft A rotates.

If R denotes the radius of the hollows 20 and $r$ that of rolls 26, the whole sequence follows the same course as though the radius $r'$ along which each mass 6 moves were equal to $R-r$, and said radius $R-r$ may be as short as may be desired.

Figure 3:
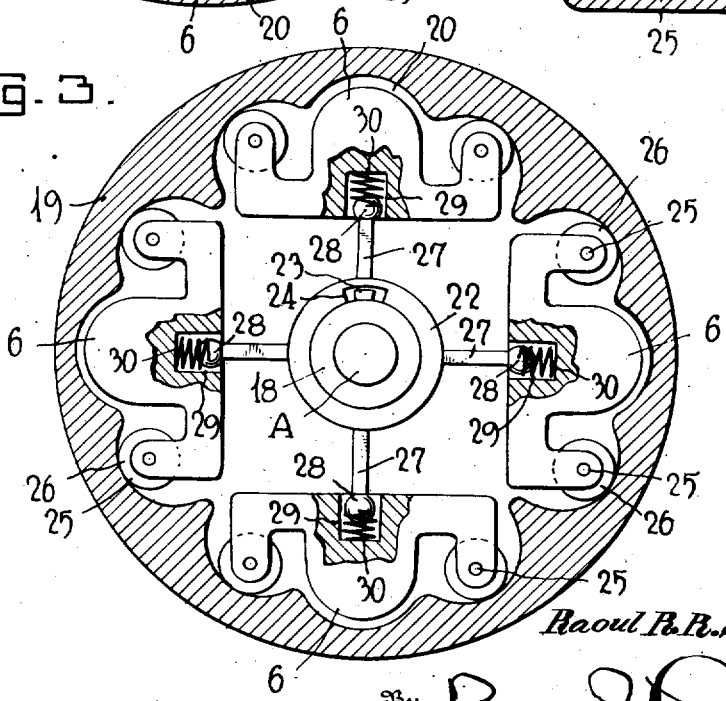
Figure 3 is a cross-sectional view of a further modified construction.

In the alternative construction shown in Fig. 3, masses 6 are connected with crown 22 by means of projecting arms 27 made integral with said crown, each of which ends in an axle or roll 28 freely entering a slot 29 provided in mass 6.

To avoid, upon stoppage taking place, the masses 6 moving radially, springs 30 may be inserted between the bottoms of slots 29 and the axles or rolls 28.

A plurality of such devices may, of course, be fitted at all suitable points along the length of the shaft under consideration; especially in front of the motor and behind the fly-wheel, if the shaft in question is that of a motor having a fly-wheel.

Figure 5:
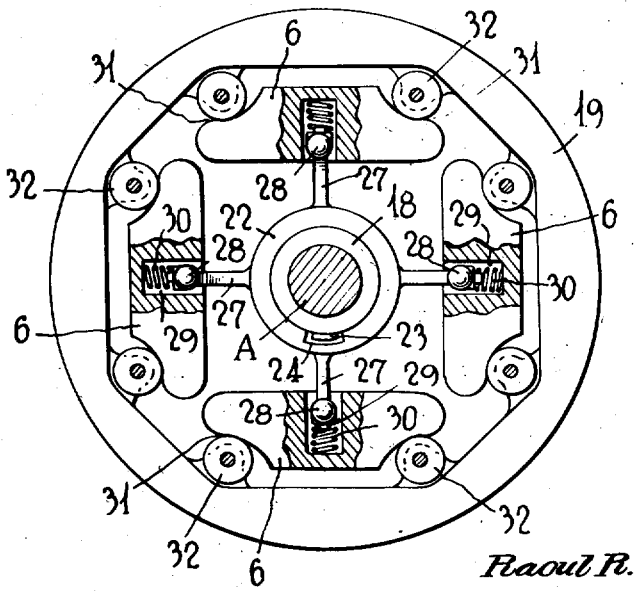
Figure 5 is a cross-sectional view similar to Figs. 1 and 3 but showing a modified construction of mobile masses and means for guiding the same.

Instead of hollows being provided in a hollow member made integral with the shaft under consideration, said hollows might equally well be made in the mobile masses themselves and bosses (preferably having rolls) made integrally with said shaft being housed in such hollows. Such a construction is illustrated in Figure 5 wherein the mobile masses 6 carried by the ball ends 28 as already described in connection with Figure 3, provide hollows 31 adjacent their opposite ends, said hollows being directed outwardly toward the rim of member 19. Said member 19 is provided with a plurality of rollers, one in each of said hollows, the parts being so arranged that the mobile masses 6 will each rest against a pair of rollers and in normal position will be symmetrical with respect to the axis of shaft A. Under torsional vibrations, said masses will ride upon rollers 32 and thereby assume unsymmetrical positions, the action and reaction tending to dampen high frequency vibrations.

In either alternative construction, said hollows may be of any desired shape apart from the circular shape.

Figure 4:
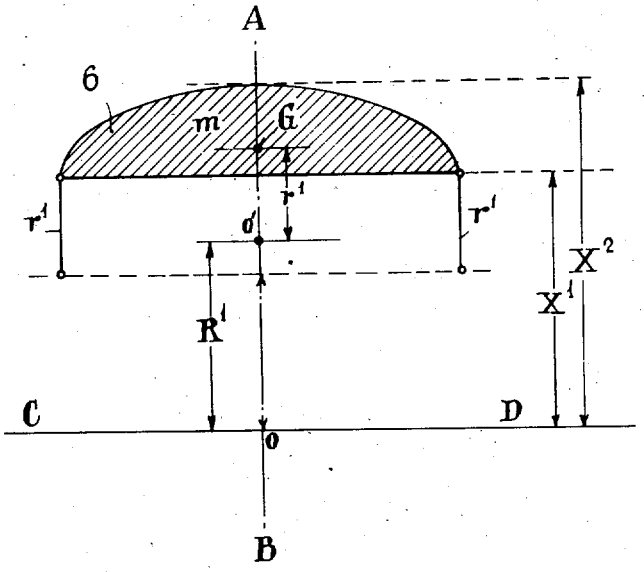
Figure 4 is a diagram explaining graphically the value of the radii of oscillation of the masses.

In the particular case of the embodiment shown by Figure 4, that is to say when in the median position of equilibrium assumed by each mass when it is subjected solely to the centrifugal force, said mass has a plane of symmetry AB passing through the axis of rotation O of the shaft that is considered, it has been ascertained that the best results are obtained by giving the radius $r'$ of each hinged link of the mobile masses (or to the aforesaid value $R-r$ equivalent to such radius) a certain value resulting from the following general formula:

$$\frac{mr'}{p}n^2=1$$

in which, with reference to Fig. 4 which illustrates diagrammatically the principle of the invention, $m$ is the mass of one of the mobile masses 6, $n$ is the order of the harmonic to be compensated, and $$p=\int_{x^1}^{x^1} x\,dm$$

$(x-r')$ being the distance from each element $dm$ of mass $m$ to the line C—D passing through axis O and at right angles to the radial plane AB.

If R' is the distance from axis O to point O' about which the center of gravity G of mass $m$ oscillates, then $$p=mR'$$

and the formula corresponding to the maximum damping of the perturbing vibrations becomes:

$$\frac{r'}{R'}n^2=1$$

This formula defines a pendulum the frequency of oscillation of which under the effect of the field of centrifugal force is $n\Omega$ when the angular velocity of the shaft that is considered is $\Omega$. That is, since the frequency of the vibrations increases as the angular speed $\Omega$ of the shaft increases, the period of the pendular damping mass at any speed $\Omega$ must be equal to $n\Omega$.

Having now particularly described and ascertained the nature of my said invention and in what manner the same operates, I declare that what I claim is:

1. In a device for reducing vibrations in a shaft, a member adapted to be rotatively carried by said shaft, a weight member, and friction reducing guiding means for mounting said weight on said carried member for movement radially and angularly with respect to said shaft, said friction reducing guiding means comprising means providing a surface on one of said members and cooperating surface providing means of different curvature on the other member, said members being in rolling engagement at said surfaces, said surfaces being held in use in operative engagement by centrifugal force and being so formed that, when they roll relative to one another, the center of gravity of said weight member describes relatively to the carried member a curved path having an intermediate portion farther from the axis of the shaft than the portions on either side thereof, said rolling engagement between said surface means being the sole force transmitting instrumentality between said members.

2. In a device for reducing vibrations in a shaft comprising two elements, one of which is a member adapted to be rotatively carried by said shaft, and the other of which is a weight member, and friction reducing guiding means for mounting said weight member on said carried member for movement radially and angularly with respect to the shaft, said friction reducing guiding means comprising means providing an arcuate path on one of said elements having an intermediate part at a different distance from the axis of the shaft than the parts on either side thereof, the other element including means providing a surface which in use is in rolling contact with said arcuate path, due to centrifugal force, such rolling contact being the sole force transmitting instrumentality between said weight member and said path during relative movement between said two cooperating elements, said path and surfaces being so formed that, when they roll relative to one another, the center of gravity of said weight member describes relatively to said carried member a curved path having an intermediate portion farther from the axis of the shaft than the portions on either side thereof.

3. In a device for reducing vibrations in a shaft, a member adapted to be rotatively carried by said shaft, weight means, friction reducing guiding means for mounting said weight means for movement radially and angularly with respect to the shaft, said friction reducing means comprising means providing a first surface of continuous curvature on said member, and cooperating cylindrical surface providing means on said weight means, said member and weight means being in rolling engagement at said surfaces, said first surface having a center of curvature eccentric to the axis of the shaft, said surfaces being held in operative rolling engagement with one another in use by centrifugal force, the respective directrices of said surfaces being such that, when said surfaces roll relative to one another, the center of gravity of said weight means describes relatively to said member an arc whose concavity is directed toward the axis of the shaft, and having an intermediate portion farther from the axis of the shaft than the parts on either side thereof, said rolling engagement being the sole force transmitting instrumentality between said weight means and said member during relative movement between said weight means and member.

4. In a device for reducing vibrations in a shaft, a member adapted to be rotatively carried by said shaft, weight means, friction reducing guiding means for mounting said weight means for movement radially and angularly with respect to the shaft, said friction reducing guiding means comprising means providing a concave arcuate path on said member whose concavity is directed towards the axis of the shaft and cooperating surface providing means on said weight means in rolling engagement with said arcuate path of less radius of curvature than said path, said surface being held in operative engagement with said path in use by centrifugal force, said path having an intermediate portion farther from the axis of the shaft than the parts on either side thereof, such rolling engagement being the sole force transmitting instrumentality between said weight means and said member during relative movement between said weight means and member.

5. In a device for reducing vibrations in a shaft, a member adapted to be rotatively carried by said shaft, a mass, friction reducing means including a curved path in said member for operatively connecting the mass with said member and adapted to permit movement between said mass and said member radially of the shaft and for guiding the movement of the mass, said friction reducing connecting and guiding means comprising a roller connected to the mass for turning movement with respect thereto, said roller and said member being adapted to be urged against each other in use by centrifugal force with the roller engaging in rolling contact with said curved path, said roller forming the sole force transmitting instrumentality between the mass and said curved path during relative movement between said mass and said member.

6. In a device for reducing vibrations in shafts, a member adapted to be rotatively carried by a shaft, said member having a curvilinear surface therein, a mass movably mounted relative to the shaft and rotatable relative to the axis of the shaft, and a roller operatively connected to the mass and in movable rolling engagement with said surface on said member to restrain the axis of said roller to movement in a curvilinear path relatively to the member, the curvature of said path being different from that of the circle of rotation of said axis about the axis of rotation of the shaft, said roller forming the sole force transmitting instrumentality between said mass and said curvilinear surface during relative movement between said member and mass.

7. In a device for reducing vibrations in shafts, a member adapted to be rotatively carried by a shaft, a mass, friction reducing means including a curved path in said member for operatively connecting the mass with said member and adapted to permit movement between said mass and said member radially of the shaft and for guiding the movement of the mass, said friction reducing connecting and guiding means comprising a roller connected to the mass for turning movement with respect thereto, said roller and said member being adapted to be urged against each other in use by centrifugal force with the roller engaging in rolling contact with said curved path, said roller forming the sole force transmitting instrumentality between the mass and said curved path during relative movement between said mass and said member, and the center of gravity of said mass being situated a constant distance away from the axis of said roller.

8. In a device for reducing vibrations in shafts, a first element adapted to be rotatively carried by a shaft, a second element, means including two coplanar curved paths in one of said elements for operatively connecting the second element with the first element and adapted to permit movement between said elements radially of the shaft in the plane including the said paths and for guiding the movement of said second element, said connecting and guiding means comprising two rollers, each movably supported by the other element, said rollers and the element which is provided with curved paths being adapted to be urged against each other in use by centrifugal force with each roller engaging in rolling contact with one of the curved paths.

9. In a device for reducing vibrations in shafts, a member adapted to be rotatively carried by a shaft, said member having two coplanar identical arcuate paths therein, a mass movably mounted relative to the shaft and rotatable relative to the axis of the shaft, and two identical rollers at two different points of the mass in rolling engagement with said arcuate paths on said member to restrain any point of the mass to movement in an arcuate path, the radius of curvature of said path being less than the radius of rotation of the center of gravity of the mass about the axis of rotation of the shaft, said rollers forming the sole force transmitting instrumentality between said mass and said arcuate paths during relative movement between said members.

10. In a device for reducing torsional vibrations in shafts, a mass exterior of a shaft and rotatably and swingably carried thereby, and two rollers at two different points of said mass arranged in the same plane perpendicular to the axis of the shaft, spaced means fixed to said shaft cooperating in rolling relation with said rollers for directing both the radial and lateral movements of the mass to a definite arcuate path for each of its points, said two rollers forming the sole force transmitting instrumentality between the mass and said last means.

11. In a device for reducing torsional vibrations in shafts, especially vibrations of high frequency, a shaft, a member mounted on said shaft to be rotated thereby, said member having a surface providing hollows therein, and a plurality of swinging masses exterior of and having connection with the shaft, and each mass having a pair of separated parts engaging in said hollows and adapted to be swung under influence of a torsional vibration to ride partly out of said hollows.

12. In a device for reducing torsional vibrations in shafts, an element adapted to be rotatively carried by a shaft, a mass, and friction reducing guiding means rotatable with the element to guide the mass whereby the center of gravity thereof moves transversely relative to said shaft in a curve having an intermediate portion farther from the axis of the shaft than the portions on either side thereof while causing said mass to move around the shaft at the mean speed thereof, there being a rolling engagement between said mass and guiding means, said rolling engagement being the sole force transmitting instrumentality between said mass and said element.

13. In a device as in claim 12 in which said mass, the form of said curve, and the location of said curve relative to the axis of said shaft are such that the natural frequency of oscillation of said mass is substantially equal to the order of the vibration to be damped times the angular velocity of the shaft.

14. In a device as in claim 8, in which the formula $$\frac{r'}{R'}\cdot n^2=1$$

is substantially fulfilled, wherein R′ is the radius from the center of the shaft to the center of oscillation of the center of gravity of said second element, and $r'$ is the radius of oscillation, with reference to Figure 4 of the drawings.

15. In a device for reducing vibrations in shafts, a member adapted to be rotatively carried by a shaft, said member being provided with a surface, a weight movable both angularly and radially relative to the shaft in a path having an intermediate portion farther from the axis of the shaft than the portions on each side thereof and as determined by the contour of said surface, and means whereby said weight may rollably move on said surface to provide for said angular and radial movement, said means constituting the sole force transmitting instrumentality between said weight and member.

16. In a device for damping vibrations of the order $n$ in a rotating shaft, a member adapted to be rotatively carried by said shaft so as to vibrate in unison with said shaft, mass means for vibrating relatively to said member, and friction reducing means mounting said mass means upon said member for causing the center of gravity of said mass means to move in an arcuate path having an intermediate portion farther from the axis of said shaft than the portions on either side thereof, said mass means, the form of said path, and the location of said path relatively to the axis of the shaft being such that the natural frequency of said mass means is substantially equal to $n$ times the angular velocity of said shaft, said friction reducing means being the sole force transmitting instrumentality between said mass means and said member.

RAOUL ROLAND RAYMOND SARAZIN.